Figure 1:
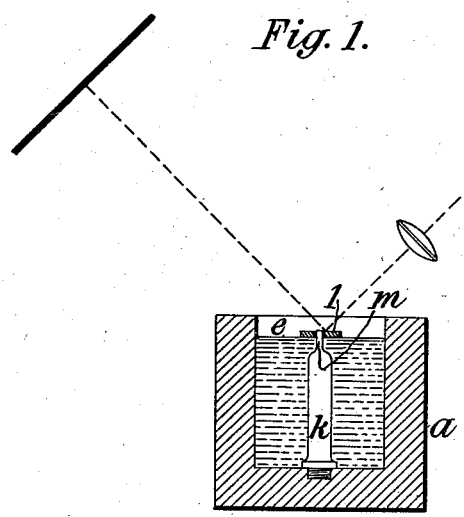

W. P. DIGBY, P. W. BEATTY & A. C. HUSKINSON.
MEANS FOR MEASURING, INDICATING, AND RECORDING VIBRATIONS.
APPLICATION FILED OCT. 8, 1910.

1,082,014. Patented Dec. 23, 1913.
3 SHEETS—SHEET 1.

WITNESSES:
René Bruine
Fred White

INVENTORS:
William Pollard Digby
Pakenham William Beatty
Arno Clarence Huskinson,
By Attorneys,
Fraser, Finch & Myers.

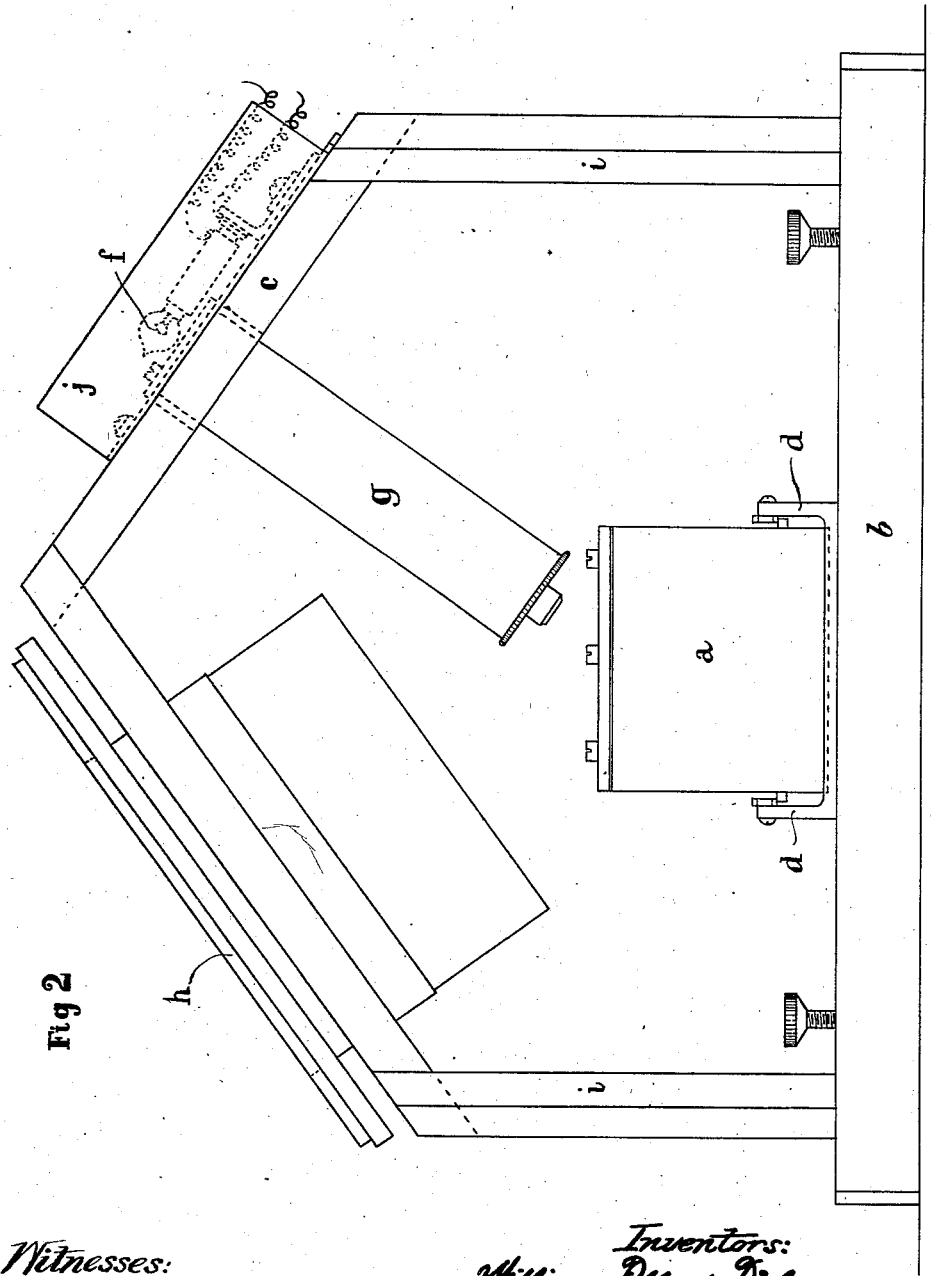

W. P. DIGBY, P. W. BEATTY & A. C. HUSKINSON.
MEANS FOR MEASURING, INDICATING, AND RECORDING VIBRATIONS.
APPLICATION FILED OCT. 8, 1910.
1,082,014.
Patented Dec. 23, 1913.
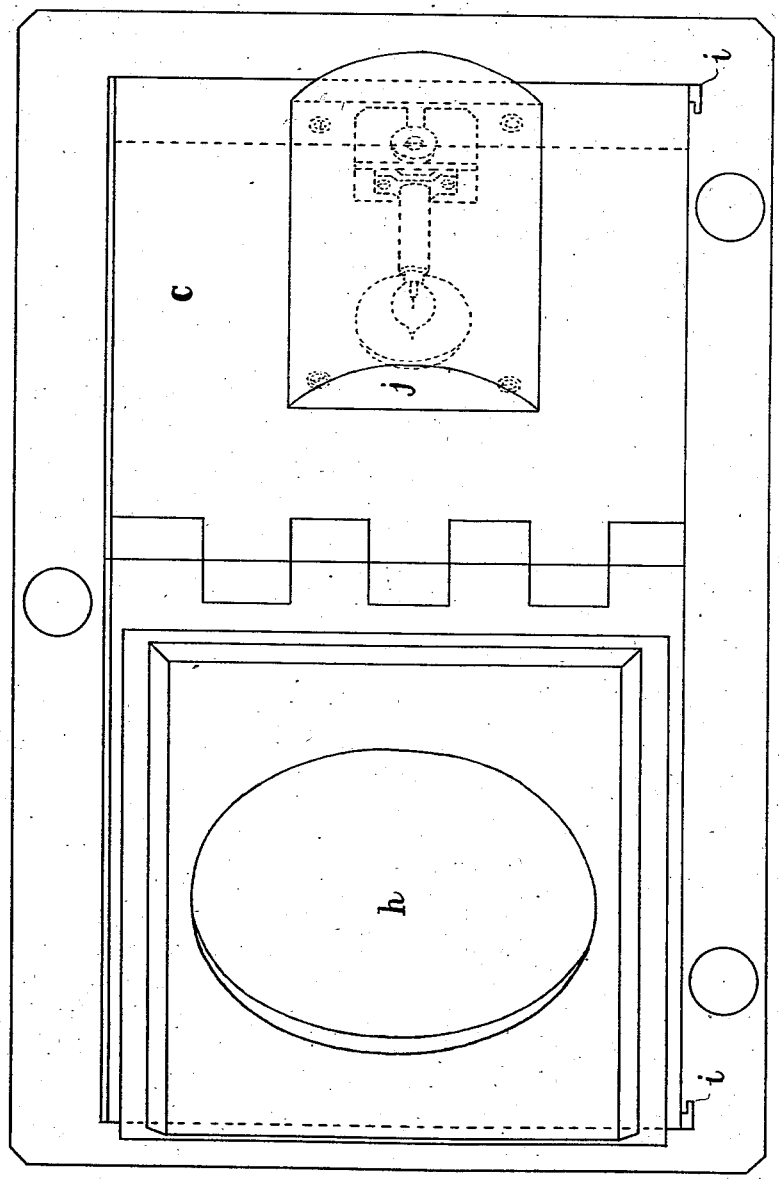

UNITED STATES PATENT OFFICE.

WILLIAM POLLARD DIGBY, OF LONDON, ENGLAND, PAKENHAM WILLIAM BEATTY, OF BAHIA BLANCA, ARGENTINA, AND ARNO C. HUSKINSON, OF BARNES, ENGLAND.

MEANS FOR MEASURING, INDICATING, AND RECORDING VIBRATIONS.

1,082,014. Specification of Letters Patent. Patented Dec. 23, 1913.

Application filed October 8, 1910. Serial No. 586,116.

*To all whom it may concern:*

Be it known that we, WILLIAM POLLARD DIGBY, of 28 Victoria street, Westminster, London, England, PAKENHAM WILLIAM BEATTY, of Bahia Blanca, Argentina, and ARNO CLARENCE HUSKINSON, of "Fontenay," Gipsy Lane, Barnes, Surrey, England, have invented certain new and useful Means for Measuring, Indicating, and Recording Vibrations, of which the following is a specification.

This invention relates to means or apparatus for detecting, indicating, comparing and recording photographically vibrations, and the object of this our invention is to provide a new compact, portable and wholly self-contained apparatus for detecting, indicating, comparing, and recording photographically vibrations, and more particularly those set up by imperfectly balanced machines, such as electric motors, turbo-generators, petrol motors, engines, turbines and the like, either in the machines themselves or transmitted to the foundations; or the vibratory effects in offices, buildings, bridges, foundations, roads, rail-roads, forts, piers, steamships, conveyances and the like, or in anything or any place, capable of producing, transmitting, or receiving vibrations and sufficiently large to carry the apparatus, irrespective of the cause or place of origin of the vibrations.

Hitherto the determination and description of such vibration has been described in vague terms lacking in precision and depending solely upon the judgment of the individual describing them, vibrations having been referred to as "negligible", "slight", "marked", "excessive", "dangerous", or by similar terms without any reference to any measuring instruments of precision calibrated with reference to an absolute standard of vibration.

In order to afford definite measurements we have therefore devised apparatus the nature and performance of which is hereinafter described.

The essential principle of this invention consists in the employment of a reflector made of metal, glass, mica, horn, bone, or the like, in flat or horizontal contact with, but without being submerged entirely in a liquid readily responsive to vibrations; this liquid is contained in a receptacle of any convenient shape and of suitable or suitably prepared material. The said reflector is anchored in a suitable way so as to allow a universal angular movement. This receptacle is placed in any convenient part of the machine, building structure conveyance or the like, producing, receiving or transmitting the vibrations to be detected, indicated, compared or recorded and may, if necessary, be firmly fixed in position, by any suitable means. The liquid contained in this receptacle responds to the vibrations, and becomes disturbed. The said reflector then responds to the motions of the liquid.

Rays of light emanating from a point source, produced by any suitable optical means, and situated above the level of the reflecting surface are projected through an optical system on to the said reflector, whence they are reflected on to, are intercepted by, and rendered visible on, a translucent screen. If necessary or convenient a second optical system may be introduced into the path of the reflected rays between the reflector and the screen for the purpose of improving the visual intensity of the reflected beam of light. Hence any movement of the reflecting medium due to vibration or concussion would cause a corresponding movement of the spot of light upon the screen.

Previous inventors have used the liquid surface by itself as a reflector which results in a blurred record of the movement of the spot of light upon the translucent screen which record has no clearly defined outline and is difficult to measure.

By the employment of a reflector the spot of light always remains focused upon the screen, and moves over the same, tracing out a figure of definite shape and outline, the shape depending upon the complexity of the vibrations being measured and the size of the figure depending upon the amplitude of the vibration.

In the case of a simple vibration the light spot traces out a straight line, the direction of the line corresponding to that of the vibration and the length of the line being a function of the amplitude of the vibration. If desired, the screen can be removed and a roll of sensitized film or paper be adapted to unroll with any convenient velocity the unrolled strip moving uniformly through the reflected beam; a permanent record of the locus of the spot being obtained thereby.

Preferably the whole apparatus is inclosed in any suitable form of casing in order to exclude any extraneous light, and may be made to be folded up or taken to pieces to facilitate transport.

We refer all measurements of vibrations, whether ascertained by the direct reflection of a beam from the disturbed reflecting liquid surface, or whether ascertained by the reflection of a beam of light from the reflector in horizontal contact with the fluid, to those obtained by attaching known weights to a perfectly balanced standard flywheel rotating at the same frequency as that of the vibration being measured, or alternatively to a standard vibration of known amplitude produced by the horizontal or vertical movement of a calibrating machine or table actuated mechanically so as to vibrate either in one plane only or synchronously or asynchronously but simultaneously in two or three planes, the said calibrating machine or table being provided with means for ascertaining the exact amplitude of its vibrations.

By referring the angular distortion of the beam of light as recorded upon the photographic plate, film or paper, to a table of degree of vibration which table sets out for any given frequency the relation between the actual amplitude of movement and the amplitude of the figure upon the screen, vibration may be expressed in terms of the actual amplitudes in fractions of a unit of length. In all cases the depth and area of the liquid are selected so that the natural frequency of oscillation of the liquid bears a definite relation to the periodicity of the vibrating medium under test. Further, by varying the dimensions of the reflector in horizontal or in the direction of the surface of the liquid, the apparatus can be adapted to detect, indicate, compare, or record photographically vibrations of very large or very small amplitude.

A construction of the apparatus according to this invention is illustrated by way of example in the accompanying drawings, of which,—

Figure 4:
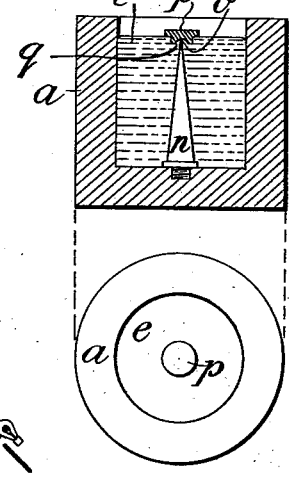
Figure 5:
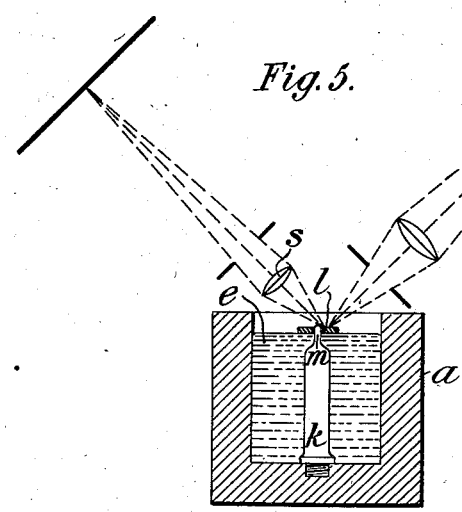
Figure 6:
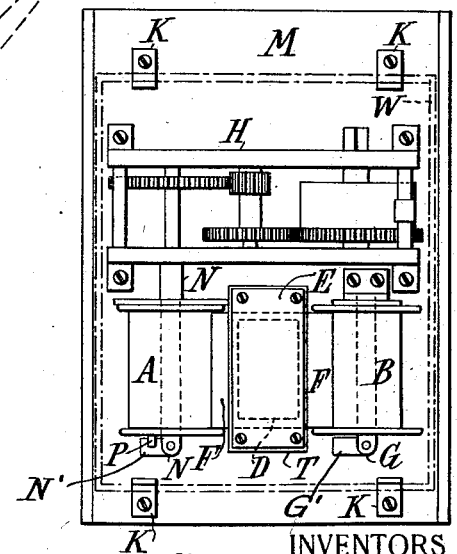

Figure 1 is a diagram of the scheme of this invention illustrating the essential principle, and also shows a convenient form of receptacle with means for anchoring a reflector in horizontal contact with the liquid when the reflector has a lower specific gravity than the liquid. Fig. 2 is a side elevation of the apparatus with sliding side removed; Fig. 3 is a plan of Fig. 2 showing the source of light the sliding lamp screen being up; Fig. 4 shows an alternative method of anchoring a reflector in horizontal contact with the liquid when the reflector has a higher specific gravity than the liquid. Fig. 5 illustrates a form of construction like Fig. 1, but showing in addition thereto an optical system in the path of the reflected rays. Fig. 6 is a view of a screen comprising a movable sensitized film.

In Figs. 1–3 $a$ is a receptacle of any convenient shape, but preferably cylindrical, is firmly fixed to the base $b$ of the light-proof casing $c$ by means of the wedge clamps $d$. It is then filled with the necessary amount of liquid $e$, preferably mercury, and the reflector to be employed is fixed in position as hereinafter described. The lamp $f$, projects a pencil of light through the optical system $g$ on the reflecting surface, whence it is reflected to the translucent screen $h$; the apparatus is closed by a removable light-tight slide, fitting in the grooves $i$. A second optical system may be introduced into the apparatus, as shown in Fig. 5, where a condensing lens $s$ is shown in the path of the reflected rays.

On placing the apparatus on the vibrating medium to be investigated, the vibrations of the same medium are transmitted through the base $b$ of the apparatus to the receptacle $a$, and thence to the liquid $e$. This liquid responds to the vibrations, and the reflector is thrown into a state of motion the pencil of light from the reflector having a corresponding angular displacement, and the spot seen upon the screen $h$ tracing out a corresponding locus; owing to the rapid motion of the spot, the locus has the appearance of a continuous figure. The reflector may be of small dimensions, where increased sensitiveness is required and decreasing grades of sensitiveness are arrived at by the employment of reflectors of increasing dimensions. Provision is thus made for the measurement of vibrations of different amplitudes, and in order to adapt the apparatus to the measurement of vibrations of different frequencies, receptacles of different and suitable dimensions are employed. The lamp guide $j$ slides over the lamp, and acts as a protector.

In order to take photographic records of vibrations on a moving sensitized film by means of the light spot, the screen $h$ fitted with the ground glass window is withdrawn from the holder and a recording screen fitted as shown in the accompanying sketch is inserted in lieu thereof. The base of this screen M is identical in dimensions with the screen $h$, so as to be interchangeable with it in the holder. This recording screen is fitted with a rectangular aperture D covered by a brass plate E, covered on its underside with black felt. The upper surface of the base M around the aperture D is also covered with a layer of black felt T for a distance all around equal to the area of the base covered by the plate E when in position. The plate E is held in position by four brass screws screwed down lightly so as to allow the sensitized film F to slip easily between the felt on the underside of E and the felt surrounding the aperture D. The screen is also fitted with a fixed spindle G to hold a reel of sensitized film B which rotates easily thereon. A second spindle N is also provided capable of being driven by the clockwork H. The film is thus wound off the drum B, via aperture D, on to the drum A. The spindles G and N are provided with pivoted ends G' N' respectively as shown, so that the ends may be turned at right angles to the main portions of the spindles in order to keep the film drums in position. The spindle N is fitted with a removable drum A, which is driven around by the spindle N, the upturned end N' engaging a pin P fitted to the end of the drum. The whole gear is covered with a tight cover W (indicated in dotted lines) held in position by the clamps K, K, K, K. For some purposes in place of the film-holder above described an ordinary plate-holder, such as used in photographic cameras, may be employed.

In Fig. 1 which shows a method of securing in position, or anchoring a reflector having a lower specific gravity than the vibration-transmitting liquid, a thin vertical spindle $k$ is provided, which is rigidly fixed to the base of the receptacle $a$ and is reduced at its top end $m$ to a very small diameter. This reduced end projects up through a central hole in the reflector $l$, the said hole being of slightly larger diameter than the reduced end of the spindle and preferably countersunk at both ends. Fig. 4 shows a method of securing in position, or anchoring a reflector having a higher specific gravity than the vibration-transmitting liquid. A thin vertical spindle $n$ is rigidly fixed to the base of the receptacle $a$ and terminates at its top end in a hard sharp point $o$. The reflector $p$ has a centrally formed conical cavity $q$ on its underside; the apex of the said cavity resting upon the point $o$ of the spindle $n$. In the two cases illustrated in Figs. 1 and 4 the reflector is by these arrangements rendered free to take up any angular movement due to the disturbing effects of the liquid, but lateral movement in any direction is effectively prevented. The construction shown in Fig. 1 is preferred.

What we claim and desire to secure by Letters Patent is:—

1. The improved means for measuring and indicating vibrations, comprising in combination a receptacle containing liquid readily responsive to vibrations, a reflector in horizontal contact with but not submerged in said liquid, means for anchoring said reflector, means whereby a beam of light from an optical system is directed on to said reflector, and a screen on to which the said beam of light is reflected from said reflector.

2. The improved means for measuring and indicating vibrations, comprising in combination a receptacle containing liquid readily responsive to vibrations, a reflector in horizontal contact with but not submerged in said liquid, means for anchoring said reflector, means whereby a beam of light from an optical system is directed on to said reflector, and means indicating the position of a point of light reflected from said reflector.

3. The improved means for measuring, indicating and recording photographically vibrations, comprising in combination a receptacle containing liquid readily responsive to vibrations, a reflector in horizontal contact with but not submerged in said liquid, means for anchoring said reflector, means whereby a beam of light from an optical system is directed on to said reflector, and a photographic screen on to which the said beam of light is reflected from said reflector.

4. The improved means for measuring and indicating vibrations, comprising in combination a receptacle containing liquid readily responsive to vibrations, a reflector in horizontal contact with but not submerged in said liquid, having a central hole, a thin vertical spindle rigidly fixed to the base of the receptacle and projecting upward through said central hole in the reflector whereby said reflector is anchored in position, means whereby a beam of light from an optical system is directed on to said reflector, and a screen on to which the said beam of light is reflected from said reflector, substantially as set forth.

5. The improved means for measuring and indicating vibrations, comprising in combination a receptacle containing liquid readily responsive to vibrations, a reflector in horizontal contact with but not submerged in said liquid, said reflector having a central hole, means engaging said hole for anchoring said reflector, means whereby a beam of light from an optical system is directed on to said reflector, and a screen on to which the said beam of light is reflected from said reflector, substantially as set forth.

6. The improved means for measuring and indicating vibrations, comprising in combination a receptacle containing liquid readily responsive to vibrations, a reflector in horizontal contact with but not submerged in said liquid, having a central hole, a vertical spindle rigidly fixed to the base of the receptacle and projecting up through said central hole in the said reflector, means whereby a beam of light from an optical system is directed on to said reflector, and a screen on to which the said beam of light is reflected from said reflector, substantially as set forth.

7. The improved means for measuring and indicating vibrations, comprising in combination a receptacle containing liquid readily responsive to vibrations, a reflector floating upon the surface of said liquid, means for anchoring said reflector, means whereby a beam of light from an optical system is directed on to said reflector, and a screen on to which the said beam of light is reflected from said reflector, substantially as set forth.

8. The improved means for measuring and indicating vibrations, comprising a vessel containing a liquid readily responsive to vibrations, a mirror floating upon the surface of said liquid, a screen and means whereby a beam of light is projected on to said mirror and reflected thereby on to said screen, substantially as set forth.

9. The improved means for measuring, indicating and recording photographically vibrations, comprising a vessel containing a liquid readily responsive to vibrations, a mirror floating upon the surface of said liquid, a recording photographic screen and means whereby a beam of light is projected on to said mirror and reflected thereby on to said recording photographic screen, substantially as set forth.

In witness whereof, we have hereunto signed our names in the presence of two subscribing witnesses.

WILLIAM POLLARD DIGBY.
PAKENHAM WILLIAM BEATTY.
ARNO C. HUSKINSON.

Witnesses:
 ALFRED B. CAMPBELL,
 HENRY S. BAKER.